(12) United States Patent
Westen et al.

(10) Patent No.: US 8,468,205 B2
(45) Date of Patent: Jun. 18, 2013

(54) METHOD AND APPARATUS FOR SELECTIVE PRESENCE OF MESSAGING SERVICES

(75) Inventors: Peter Westen, Mountain View, CA (US); Justin Mcleod North Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 578 days.

(21) Appl. No.: 12/726,302

(22) Filed: Mar. 17, 2010

(65) Prior Publication Data

US 2011/0231495 A1 Sep. 22, 2011

(51) Int. Cl.
*G06F 15/16* (2006.01)

(52) U.S. Cl.
USPC ............................ 709/206; 709/201; 709/203

(58) Field of Classification Search
None
See application file for complete search history.

(56) References Cited

U.S. PATENT DOCUMENTS

| | | | |
|---|---|---|---|
| 7,451,190 B2 | 11/2008 | Szeto | |
| 7,590,696 B1 * | 9/2009 | Odell et al. | 709/206 |
| 7,631,266 B2 | 12/2009 | Werndorfer et al. | |
| 7,779,387 B2 * | 8/2010 | Harry et al. | 717/113 |
| 2004/0003037 A1 | 1/2004 | Fujimoto et al. | |
| 2004/0267942 A1 * | 12/2004 | Maes | 709/228 |
| 2007/0233798 A1 * | 10/2007 | Kelley et al. | 709/206 |
| 2008/0114776 A1 * | 5/2008 | Sun et al. | 707/10 |
| 2008/0256192 A1 | 10/2008 | Pinard et al. | |
| 2009/0271696 A1 * | 10/2009 | Bailor et al. | 715/229 |
| 2010/0138704 A1 * | 6/2010 | Johnson et al. | 714/57 |

* cited by examiner

*Primary Examiner* — Aaron Strange
*Assistant Examiner* — Keyvan Emdadi
(74) *Attorney, Agent, or Firm* — Blakely, Sokoloff, Taylor & Zafman LLP

(57) ABSTRACT

Method and apparatus for maintaining presence settings of a user for buddies selected from different buddy groups regardless of which user accounts and which buddy accounts are used in a plurality of messaging services for the user and the buddies are described. The user may subscribe to the messaging services via one or more user accounts. Each buddy may subscribe to the messaging services via one or more buddy accounts. A presence setting may be associated with a buddy group including at least one buddy account of the buddies. One or more service specific settings matching the presence settings may be identified. Each service specific setting may specify a service specific presence of a messaging service for one of the user accounts and one of the buddy accounts. A presence notification message for the service specific setting may be determined to notify the messaging service for the presence setting.

29 Claims, 10 Drawing Sheets

301 {
User: Peter  
Buddies: Justin, Ricci, Matt, Jane, Jeromy, Joe  
Message Services: A, B  
Statuses: Available, Away, Offline  
Groups: Work, Home, Music
}

300A

Accounts: 303

|  | A | B |
|---|---|---|
| Peter | PeterA | PeterB |
| Justin | Justin1, Justin2 | Justin3 |
| Ricci | Ricci1 | Ricci2 |
| Matt | Matt1 |  |
| Jane | Jane1 |  |
| Jeromy |  | Jeromy1 |
| Joe | Joe1 | Joe2 |

Groups: 305

|  | A | B |
|---|---|---|
| Work | Justin1, Justin2, Ricci1 | Justin3, Jeromy1 |
| Home | Matt1, Justin2 | Justin3, Joe2 |
| Music | Jane1, Ricci2 |  |

309 Local Presence Statuses: Available, Away, Offline

311 Service Specific Presences for Messaging Service A: Online, Away, Offline

313 Service Specific Presences for Messaging Service B: Available, Idle, Unavailable

FIG. 3A

Service Specific Presences for Service A 313

| A | | |
|---|---|---|
| Justin1 | Online | ← 319, 321 |
| Justin2 | Offline | |
| Ricci1 | Online | |
| Matt1 | Offline | |
| Jane1 | Online | |
| Joe1 | Away | |

Service Specific Presences for Service B 315

| B | |
|---|---|
| Justin3 | Unavailable | ← 323
| Jerom1 | Available |
| Joe2 | Idle |
| Ricci2 | Unavailable |

Selective Presence Statuses 317

| Work | | |
|---|---|---|
| Justin | Available | ← 325 |
| Ricci | Available | |
| Jeromy | Available | |
| Home | | |
| Matt | Offline | ← 327 |
| Justin | Offline | |
| Joe | Away | |
| Music | | |
| Jane | Available | |
| Ricci | Offline | |

Settings (for buddy groups):329

| | Statuses |
|---|---|
| Work | Available |
| Home | Offline |
| Music | Away |
| Joe | Available |

331 ↓
333 ↗

Presence Status Constraints: 335

| Buddy selection | Representation of constraints |
|---|---|
| Justin at Work 337 | Online(PeterA, Justin1) or Online(PeterA, Justin2) or Available(PeterB, Justin3) 341 |
| Ricci at Work | Online(PeterA, Ricci1) |
| Jeromy at Wrok | Available(PeterB, Jeromy1) |
| Justin at Home 339 | Offline(PeterA, Justin2) and Unavailable(PeterB, Justin3) 343 |
| Joe at Home | Unavailable(PeterB, Joe2) |
| Matt at Home | Offline(PeterA, Matt1) |
| Jane at Music | Away(PeterA, Jane1) |
| Ricci at Music | Idle(PeterB, Ricci2) |
| Joe | Online(PeterA, Joe1) or Available(PeterB, Joe2) |

Notification Messages (for presence status): 345

| A | Online(PeterA, Justin1, Ricci1, Justin2, Joe1), Offline(PeterA, Matt1), Away(PeterA, Jane1) 347 |
|---|---|
| B | Available(PeterB, Jeromy1), Unavailable(PeterB, Justin3), Unavailable(PeterB, Joe2), Idle(PeterB, Ricci2) 349 |

FIG. 3C

METHOD AND APPARATUS FOR SELECTIVE PRESENCE OF MESSAGING SERVICES

FIELD OF THE INVENTION

The present invention relates generally to communications. More particularly, this invention relates to presence statuses for messaging systems.

BACKGROUND

With the proliferation of available messaging services, supporting more than one separate messaging service has become a common feature for more and more messaging clients, such as multi-system IM (Instant Messaging) clients. Typically, a multi-system IM client provides the capability to set one presence status for a user of the IM client across different messaging services. For example, a presence setting for the user to appear as "Away" may be translated to an "Away" setting for all the associated messaging services in the IM client, such as AOL, Google, Yahoo, etc. The user may have multiple user accounts subscribing to the different messaging services. As a result, each user account has to appear "Away" in the corresponding messaging service.

Moreover, the presence status label (e.g. "Away" or "Busy", etc.) for the same status can vary across messaging services. For example, one service can use "away" while another service uses another label for the same status indicating unavailability for message exchanges. Furthermore, the statuses may not match one-to-one between the services. This contributes to the difficulty in managing multiple messaging services.

Alternatively, a user may be required to set separate service specific presences for different user accounts in different messaging services. As the number of user accounts increases with the growing number of messaging services, however, iterating through multiple user accounts and keeping track of which service specific presences are supported by which messaging services tend to be tedious and error prone. Worse yet, as a buddy is able to communicate with the user via multiple buddy accounts and multiple user accounts, determining which service specific presence for each user account with respect to the buddy accounts may not be practically feasible, if not impossible.

Therefore, existing messaging clients and/or messaging servers do not facilitate a user with a friendly environment to manage presence statuses for multiple messaging services.

SUMMARY OF THE DESCRIPTION

In one embodiment, a presence such as a local presence status may indicate a state for message exchanges between the user and a buddy and/or buddy group, such as "away", "available", "working", "in meeting" etc. To illustrate, if user A has buddies B, C and D established via multiple messaging services using multiple user accounts (for user A) and buddy accounts (for buddies B, C and D), user A may designate buddies B and D as seeing user A with presence "available" and designate buddy C as seeing user A with presence "working". These presences may be maintained in a messaging client by user A as local presence statuses without regard to which actual messaging services and accounts user A and buddies B, C and D independently log in and out of An embodiment of the present invention can include methods and apparatuses that maintain presence settings of a user for buddies selected from different buddy groups regardless of which user accounts and which buddy accounts are used in multiple messaging services for the user and the buddies. The term "buddies" and "buddy" may refer to other users or other user accounts participating in communications, such as an instant messaging communication, with the user through one or more messaging services, including, for example, AOL's (America On-Line) instant messaging service or Yahoo's instant messaging service or other communication services. It will be understood that the use of the term "buddy" does not mean that the messaging service is an AOL instant messaging service, but rather the messaging service can be any messaging service used to communicate with one or more other users. A "buddy" of a user can be another user who is listed in a contact or address list or other lists (e.g. a "buddy list") of the user, and the list can be created by the user or by the user's system; in some embodiments, a "buddy" may not be required to be stored in a list.

In one embodiment, the user may subscribe to the messaging services via one or more user accounts. Each buddy may subscribe to the messaging services via one or more buddy accounts. A presence setting may be associated with a buddy group including at least one buddy account of the buddies. One or more service specific settings matching the presence settings may be identified. Each service specific setting may specify a service specific presence of a messaging service for one of the user accounts and one of the buddy accounts. A presence notification message for the service specific setting may be determined to notify the messaging service for the presence setting. As a result, the user may not need to go through each different account for updating service specific presence statuses.

According to another aspect of the invention, service specific presences for accounts in a plurality of messaging services may be collected in a messaging client associated with the messaging services. Each service specific presence may be published for an account of a buddy in a messaging service. A presence status for a buddy in a buddy group may be determined according to the service specific presences collected for accounts associated with the buddy in the buddy group. The presence status for the buddy in the buddy group may be presented in a graphical user interface of the messaging client without revealing the buddy accounts associated with the buddy in the buddy group.

According to another aspect of the invention, presence status constraints may be generated from presence settings for a user to appear to buddies via multiple messaging services. Each presence status constraint may include one or more service specific settings. Each service specific setting may specify a service specific presence for a messaging service between one of the user accounts for the user and one of the buddy accounts for the buddies. Conflicts may be identified among the generated presence constraints to avoid setting multiple service specific presences for one single user account. If the conflicts identified cannot be resolved, a notification may be presented via a user interface of a messaging client. User intervention may be solicited to update the presence settings until the conflicts are resolved.

According to another aspect of the invention, presence status constraints may be generated in response to presence settings received in a server from a messaging client for a user to appear to buddies of the user in one or more messaging services. Each presence setting may specify a presence status for a user associated with one or more user accounts to appear for one or more buddies, each buddy having one or more buddy accounts. Conflicts among the generated presence constraints may be resolved in the server to publish service specific presences of at least one user account with respect to at least one buddy account. The messaging client may be notified, e.g. via conflict notification messages, if the conflicts cannot be resolved.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A-3C are examples illustrating sample settings for selective presence;

DETAILED DESCRIPTION

Figure 1:
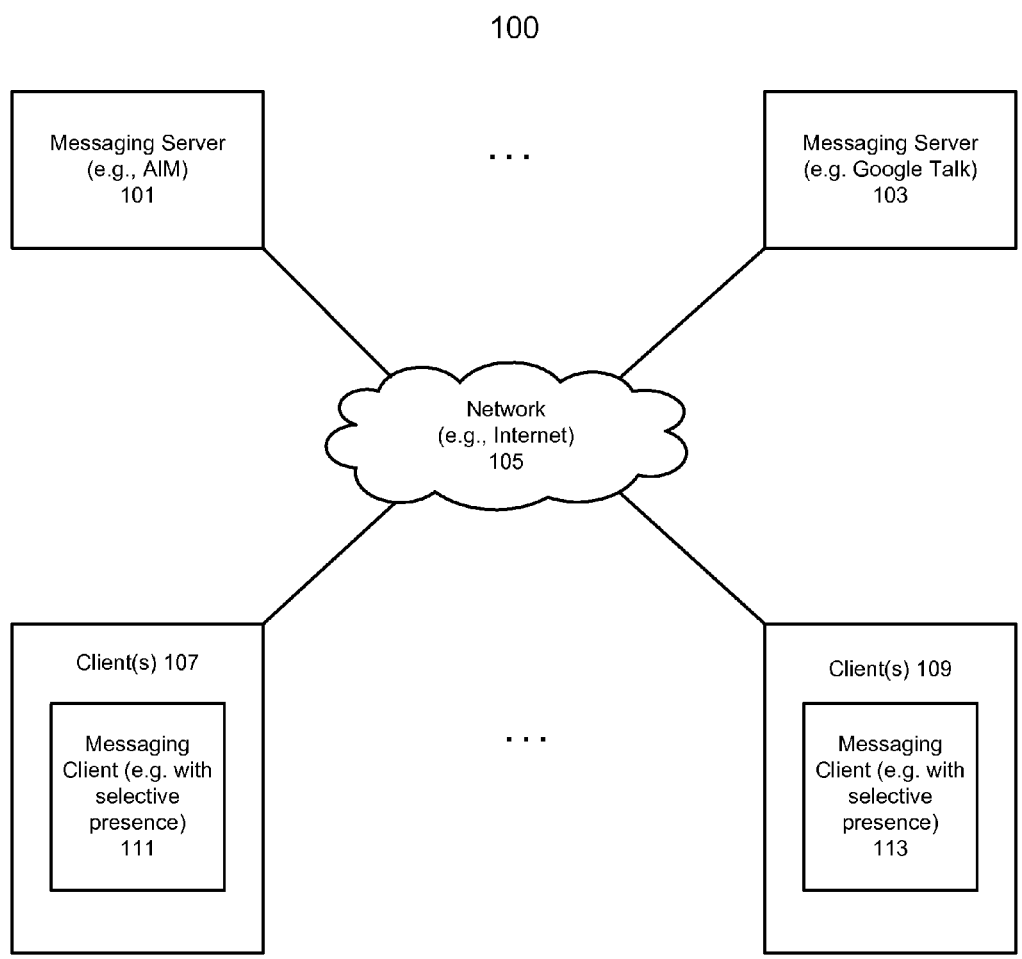
FIG. 1 is a block diagram illustrating a network environment for supporting communications in messaging services according to one embodiment of the invention.

Method and apparatus for selective presence of messaging services are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According some embodiments, a messaging client (e.g. an IM client, a chat client or other communication client etc.) may be configured to allow a user to unify accounts from multiple messaging services to simplify presence settings between the user and buddies established over the multiple messaging services. The user may select groups of buddies (or buddy groups) independent of which services or messaging services the user and the buddies are actually subscribed to. The user may selectively set presences (or presence statuses, presence states) for the user with respect to the groups based on local presence statuses as abstract representations over service specific presences provided by each of the multiple messaging services.

In one embodiment, a presence such as a local presence status may indicate a state for message exchanges between the user and a buddy and/or buddy group, such as "away", "available", "working", "in meeting" etc. To illustrate, if user A has buddies B, C and D established via multiple messaging services using multiple user accounts (for user A) and buddy accounts (for buddies B, C and D), user A may designate buddies B and D as seeing user A with presence "available" and designate buddy C as seeing user A with presence "working". These presences may be maintained in a messaging client by user A as local presence statuses without regard to which actual messaging services and accounts user A and buddies B, C and D independently log in and out of. The setting of a presence of a user, as seen by his buddies for a group of buddies can be set, in one embodiment, without regard to the messaging services.

In one embodiment, the exact terminology for each presence status (or service specific presence) may vary across multiple messaging services. A messaging client may facility a user to determine or configure how each service specific presence map to which local presence statuses the messaging client offers to the user in the UI (User Interface). As an example, one messaging service might use the term "Away" while another uses "Busy" to indicate unavailability for message exchanges. Additionally, service specific presences between different messaging services may not match one-to-one. For example, in one messaging service, both "Not Available" and "Do Not Disturb" may be provided as two different service specific presences to indicate slightly different notions of unavailability for message exchanges. However, service specific presence "Away" may be the only one service specific presence in another messaging service to indicate unavailability for message exchanges.

Further, a user may appear with different presences for different buddies selected from different buddy groups. These different buddies may be within a single buddy list of the user. A buddy list may include a list of people the user wants to keep track of in one or more messaging services. Status appearance (or presence statuses) may be centered on people instead of accounts, and an address entry for a person (e.g. in a contact or address file) may specify each messaging service and the address or account address for that person at each messaging service, and this data can be used to set status appearance in a way that is centered on the person. Different presence statuses may be designated for different people, e.g. according to selective presence settings, regardless of which accounts are used. For example, a user may be hidden from a particular group of buddies in a messaging service while other users of the messaging service may be allowed to see the user regardless of which accounts and messaging services are used by the user and the buddies. When receiving selective presence settings from the user for a group of buddies, a messaging client may set service specific presences of the user for each buddy in the group without altering a local presence status of a buddy of the user not in the group.

In one embodiment, accounts associated with a user of a messaging client supporting multiple messaging services may be unified together. Accounts associated with buddies of the user established over the multiple messaging services may be similarly unified for each buddy. Local presence statuses may be configured in the messaging client to support a selective presence setting which designates a local presence status for the user with respect to a buddy or a buddy group under the unified accounts. To support presence statuses for unified accounts, the messaging client may be capable of performing reconciliation or conflict resolution among multiple local presence settings to determine which services specific presences to notify corresponding messaging services for different buddy accounts or groups of buddy accounts in the unified accounts. Alternatively, the messaging clients may notify a remote server to perform the conflict resolution for the messaging services, e.g. via a messaging protocol supporting setting service specific presences for a group of accounts.

In some embodiments, multiple buddy lists in multiple messaging services may be merged in an address book or other contact applications having contact cards for representing buddies. Multiple messaging accounts may be associated with a person, e.g. a user or a buddy of the user, via a contact application. Alternatively, a messaging client may rely on user selection or indication, e.g. a selection of a name from a user, for associating multiple accounts to a person. When exchanging messages with a buddy having multiple buddy accounts which are available according to service specific presences published, a messaging client may select one of the buddy accounts to contact based on heuristic guesses. For example, if the user of the messaging client switches to a particular user account, another buddy account of the same service type and/or the same account type, e.g. in the same messaging service, as with the particular user account may be selected. In other embodiments, a user interface may provide a menu for the user to select or overwrite the buddy account selection.

FIG. 1 is a block diagram illustrating a network environment for supporting communications in messaging services according to one embodiment of the invention. Referring to FIG. 1, network environment 100 includes one or more messaging servers 101-102 for providing messaging services, such as chat or instant messages, to one or more client systems 104-105 over a network 103. Messaging servers 101-102 may be any kind of messaging servers that provide messaging services for real time and/or near real-time messages, such as, for example, AOL instant messenger (AIM), Google TALK instant messenger, chat services, text services, SMS (Short Message Services) or other communication services that support the exchange of messages or communications, etc. Client systems 104-105 may be any kind of computing devices, such as, for example, laptop or desktop computers, entertainment devices such as game devices (e.g. Nintendo DS), personal digital assistants (PDAs), cellular phones, smartphones, embedded devices or consumer electronic devices, etc.

Each of the client systems 104-105 may include a messaging client (e.g., messaging clients 106-107). A messaging client may communicate with multiple messaging servers to facilitate messaging communications and presence state (or status) updates for separate messaging services. In one embodiment, each of client systems 104-105 may include multiple messaging service clients or multiple instances of a messaging service client, where each messaging service client can support messaging communications via a different messaging service provider (e.g., AIM or Google TALK). Additionally, a messaging client may be a stand-alone application or may be integrated into an operating system of a client system or into another application executing on the client system, such as a web browser. For example, a messaging client may be an iChat™ client application available from Apple Inc. of Cupertino, Calif.

In one embodiment, some of client systems 104-105 can allow users to communicate via voice communications (e.g., telephonic communications and voicemails), e-mails, and SMS (short message service) text messaging. Some communications devices can be loaded with instant messaging applications (also referred to as chat applications), such as iChat™ available by Apple Inc. of Cupertino, Calif. These applications can allow users to send real-time or near real-time (e.g. within a known time delay, such as seconds or minutes etc.) communications requests (e.g., text, audio, and/or video) to each other.

In facilitating messaging communications between client systems, messaging servers 101-102 may support messaging communications in multiple formats including, but not limited to, chat rooms, instant messaging, IRC (Internet Relay Chat), and text messaging via multiple types of media including, but not limited to, text, voice, graphics, video, and file transfer.

In addition, in facilitating messaging communications between client systems, messaging servers 101-102 may support monitoring the presence or the presence status of each user currently logged in, via one or more user accounts in the messaging services supported by messaging servers 101-102, through a messaging client and distributing the presence status of each user to other users logged in through other messaging clients. For example, the presence of the user logged in at client system 104 may be broadcast via one of messaging servers 101-102 to client system 105 because the users logged in at these client systems have requested to monitor the presence of the user logged in at client system 104.

In one embodiment, a messaging client may be configured with buddies (or remote users) participating in multiple messaging services with a local user. Each buddy may represent a separate user who may send/receive messages, e.g. instant messages, with the local user of the messaging client via at least one of the messaging services. A buddy may have more than one distinct buddy accounts, each buddy account belonging to one of the messaging services. In addition, the buddies may be grouped into one or more buddy groups as specified by the local user based on the buddy accounts.

According to one embodiment, the messaging client may present a graphical user interface (GUI) including lists of buddy groups and/or buddies with selective presence statuses for a local user to separate managing messaging accounts (e.g. actual user accounts and/or buddy accounts) in different messaging services and managing message communications. Thus, the local user is enabled to exchange messages, e.g. sending/receiving messages, setting/receiving presence statues, etc., with buddies and/or buddy groups, without the need to directly access the messaging accounts and/or the messaging services. The messaging client might indicate the messaging accounts and/or messaging services used in message communication for informational purposes. Selective presence statues may be based on multiple local presence statues configured in the messaging client instead of service specific presence provided by a particular messaging service. A local presence status may indicate one or more combinations of service specific presences from one or more messaging services. In one embodiment, selective presence statuses presented via the messaging client can allow a buddy to appear with different local presence statuses in different buddy groups.

Figure 2:
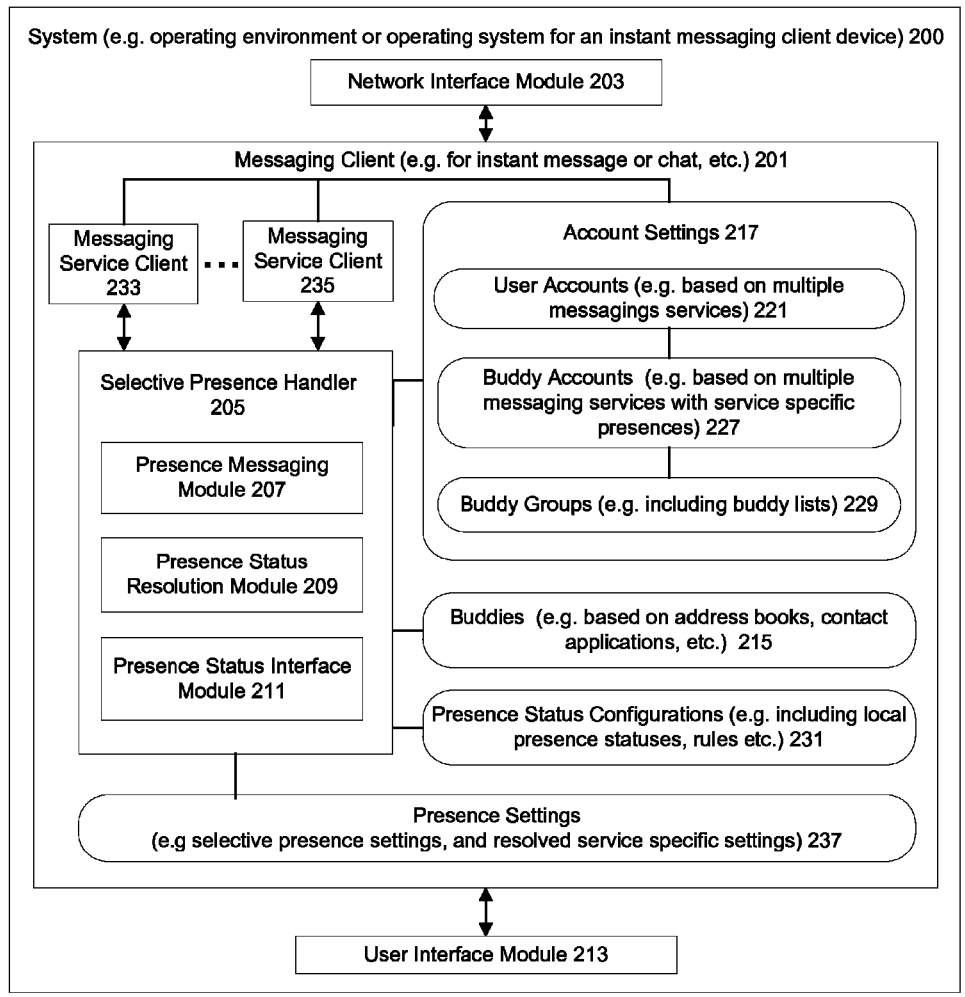
FIG. 2 is a block diagram illustrating one embodiment of a system for selective presence in a messaging client.

FIG. 2 is a block diagram illustrating one embodiment of a system for selective presence in a messaging client. For example, system 200 may be an operating system or operating environment providing messaging client 201, such as implemented as part of clients 106 and/or 107 of FIG. 1. Referring to FIG. 2, messaging client 201 may include account settings 217 to support multiple messaging services, such as via messaging servers 101 and/or 103 of FIG. 1. In one embodiment, messaging client 201 may send/receive messages and/or service data including presence statuses (or states) for multiple messaging services via network interface module 203. Additionally, messaging client 201 can configure individual accounts and/or individual messaging services for a local user when interacting with the local user via user interface module 213 for message communication and/or presence status. Note that components as shown in FIG. 2 are described for the purpose of illustration only; more or fewer components may also be implemented. Also note that some or all of the components as shown in FIG. 2 may be implemented in software, hardware, or a combination of both.

Messaging client 201 may be an instant message client, a chat client or other messaging application client supporting one or more messaging services. In one embodiment, messaging client 201 can serve a local user to communicate with remote buddies configured in buddies 215. The local user may update buddies 215 via an address book or other contact applications. Alternatively, network interface client 203 may allow a local user to configure buddies 215 directly, such as adding/deleting buddies for messaging client 201.

Typically, messaging data such as messages or presence statuses are communicated between messaging client 201 for a local user and a remote client for a buddy via a user account of a local user in a messaging service and a buddy account of a buddy in the same messaging service as configured in account settings 217. In one embodiment, account settings 217 may include one or more user accounts 221 for the local user and one or more buddy accounts 227 for buddies 215. Each account in user accounts 221 or buddy accounts 227 may belong to one of multiple messaging services associated with messaging client 201. Each buddy in buddies 215 may be associated with one or more accounts of buddy accounts 227. Conversely, each account in buddy accounts 227 can belong to no more than one buddy in buddies 215.

Account settings 217 may include groups 229 configured with subsets of buddy accounts 227, such as a buddy group or buddy list. A buddy group may include one or more buddy accounts belonging to one or more messaging services. A buddy list may be a buddy group for buddy accounts in one messaging service. One or more buddies may be associated with a buddy group. Conversely, a buddy may have multiple buddy accounts designated to different buddy groups. Messaging client 201 may provide graphical user interface for a local user to specify/configure buddy groups 229 to allow the local user to interact with the messaging client 201 for message exchanges or presence status updates at an abstract layer including buddies and buddy groups to shield the local user from the underlying user accounts, buddy accounts, and/or messaging services supporting the abstract layer. In some embodiments, messaging client 201 may include mechanisms for maintaining buddy groups 229, e.g. to alert the local user of changes of buddy accounts (addition/deletion, etc.) notified from a remote source (such as a messaging device, service, server, or other applications, etc).

Each user account in user accounts 221 may be associated with a service specific presence with respect to one or more buddy accounts in buddy accounts 227. A service specific presence may be a presence status for a messaging account specific for a messaging service. The presence status may indicate online information about a user of the messaging account for other users of the messaging service, e.g. to make decisions on how to contact the user. Different messaging services may provide (or recognize) different sets of service specific presences. Service specific presences from different messaging services may represent same or similar user information with varied granularities of details. For example, a service specific presence with value "online" in one messaging service may indicate availability for message exchange for a messaging account. A similar service specific presence may be with value "available" in another messaging service to indicate availability for message exchange. Alternatively, a messaging service may provide multiple service specific presences with values such as "in meeting", "out to lunch", "in traffic" etc. to indicate further details on unavailability for message exchange.

In one embodiment, presence status configurations 231 may specify a predetermined number of local presence statuses to represent presence statuses between a user and a buddy or a buddy group for messaging client 201 across multiple messaging services without being limited to a particular one or a particular group of messaging services. Typically, a local presence status has a value (e.g. "available", "away", "offline") configured by a local user to indicate a presence status employed in a graphical user interface of a messaging client. Additionally, presence status configurations 231 may include rule sets to determine a local presence status mapped from an individual or a combination of service specific presence statuses, each corresponding to a different account in one of the messaging services. For example, an exemplary rule may assign a local presence status of a buddy as "available" for multiple accounts associated with the buddy, e.g. according to a buddy group, if at least one of the accounts has a service presence status indicating availability for message exchanges via corresponding messaging services.

According to one embodiment, presence settings 237 may store selective presence settings previously specified and service specific settings supporting the selective presence settings. A selective presence setting may specify a local presence status for a local user with respect to a buddy group. A service specific setting may specify a service specific presence for a user account with respect to one or more buddy accounts. Alternatively, a selective presence setting may designate a service specific presence for a buddy account with respect to a user account, such as broadcasted or notified by a corresponding messaging service. In one embodiment, selective presence settings may be supported or implemented via any of one or more combinations of service specific settings. On the other hand, however, a set of selective presence settings entered by the local user may include conflicts which cannot be resolved by any combination of possible service specific settings via existing user accounts, buddy accounts and service specific presences of the messaging services.

Messaging service clients 233 . . . 235 can maintain communications with one or more messaging services via network interface module 203. Each messaging service client 233/235 may process messaging data and/or presence statues for one particular messaging service configured for messaging client 201. Messaging service client 233/235 may communicate with a corresponding messaging service (e.g. via a remote messaging server) for a corresponding user account with buddy accounts based on account settings 217, such as setting/receiving service specific presences. Messaging service client 233/235 may constantly listen to message data or service specific presence updates sent/published from an associated messaging service. More than one messaging service clients 233/235 may communicate with a single messaging service. In one embodiment, a messaging service client 233/235 may be based on a separate messaging client application.

Messaging client 201 may include selective presence handler 205 for managing presence statuses, such as service specific presences and/or local presence statues based on account settings 217. For example, selective presence handler 205 can determine a combination of service specific settings to support selective presence settings entered by a local user of the messaging client 201 automatically. The selective presence handler 205 may verify if multiple selective presence settings include conflicts which cannot be resolved (i.e. possible service specific settings cannot be found to support the multiple selective presence settings). Additionally, selective presence handler 205 can enable the local user to access local presence statuses for buddies 215 and/or buddy groups 229, and/or to update presence settings 237 without the need to manage the underlying user accounts 221, buddy accounts 227 and associated messaging services.

In one embodiment, selective presence handler 205 may include presence status interface module 211 to interact with a local user of messaging client 201 for presence setting and presentation. For example, presence status interface module 211 can present a setting window for the local user to enter selective presence settings including local presence statuses for buddy groups while shielding the local user from the requirement to directly manage each messaging service and/or each buddy account. In addition, present interface module 211 may present a local presence status for a buddy selected via a buddy group without revealing service specific presences for associated buddy accounts in corresponding message services. Local presence statues for one buddy in different buddy groups may differ depending on which buddy accounts are associated with the buddy in each buddy group. In one embodiment, presence interface module 211 may unify or combine separate service specific presences published via multiple messaging services for one or more buddy accounts into a local presence status for a buddy in a buddy group, e.g. according to presence status configurations 231.

In one embodiment, presence status resolution module 209 may identify a conflict among selective presence settings according to possible service specific settings among user accounts and buddy accounts in associated messaging services. A common source of conflict may be based on the fact that one user account cannot be required to appear to a buddy account with more than one presence statuses, such as both "offline" and "online" at the same time. Conflicts may be resolved by limiting the possible service specific settings. Presence status resolution module 209 may generate a collection of presence status constraints on possible service specific settings for conflict identification/resolution, e.g. based on a set of rules configured in presence status configurations 231. A constraint may specify, for example, a set of possible service specific presences allowed for a user account, such as "in the meeting", "out of office", "away" etc. with respect to a buddy account to indicate the user account is not available for message exchanges for a local presence status "unavailable" indicating a user having the user account is not available for message exchange for a buddy with the buddy account.

In one embodiment, if conflicts can be resolved or there is no conflict identified, presence status resolution module 209 may select, e.g. heuristically, one of many possible combinations of service specific settings which satisfy presence status constraints generated from selective presence settings. Heuristics may include minimizing a number of notification messages required for publishing the service specific settings, e.g. for a particular messaging service or a certain subsets of messaging services etc. Conversely, if conflicts identified cannot be resolved, presence status resolution module 209 may notify a local user, e.g. via user interface module 213, with the conflicts identified.

Selective presence handler 205 may include presence messaging module 207 to interface (e.g. to send/receive messages or data) with multiple messaging services associated with messaging clients 233/235. For example, messaging clients 233/235 may forward a notification message published from a messaging service to presence messaging module 207. The notification message may include a service specific presence for a buddy account with respect to a user account. In response, presence messaging module 207 may update buddy accounts 227 accordingly. Presence messaging module 207 may notify presence status interface module 211 with changes in service specific presences of buddy accounts 227 to synchronize the changes of presence statuses with a graphical user interface.

In one embodiment, presence messaging module 207 may determine one or more notification messages or presence notification messages to set up changes in service specific presences in user accounts 221 for corresponding messaging services. For example, presence status interface module 211 may notify presence messaging module 207 when selective presence settings received for a local user have been resolved in user accounts 221 via presence status resolution module 209. In response, presence messaging module 207 may identify one or more presence notification messages for a user account with updated service specific settings according to messaging protocols provided by a messaging service associated with the user account. A presence notification message may be an account presence notification message to notify a service specific presence with respect to one buddy account. Alternatively, a presence notification message may be a group presence notification message to notification a service specific presence with respect to a group of selected buddy accounts. A messaging service may a protocol including account presence notification messages without supporting group presence notification messages. Typically, a group presence notification message may correspond to multiple account presence notification messages. Presence messaging module 207 may determine using a single group presence notification message instead of using multiple account presence notification messages. In one embodiment, presence messaging module 207 may direct messaging service clients 233/235 to sending presence notification messages for corresponding messaging services.

FIGS. 3A-3C are examples illustrating sample settings for selective presence. Examples 300A, 300B and 300C may be based on a messaging client with selective presences in a system such as system 200 of FIG. 2. Referring to FIG. 3A, in one embodiment, a messaging client, such as client 201 of FIG. 1, may include a exemplary configuration 301 with a local user "Peter"; six buddies "Justin", "Ricci", "Matt", "Jane", "Jeremy", and "Joe"; messaging services "A" and "B"; local presence statuses "Available", "Away" and "Offline"; and three buddy groups "Work", "Home" and "Music". Local user "Peter" may subscribe to messaging services "A" and "B" with the buddies via various buddy accounts 303, e.g. as specified in account settings 217 of FIG. 2.

In one embodiment, local user "Peter" may subscribe to messaging service "A" and "B" using user accounts "PeterA" and "PeterB" respectively, e.g. as specified in user accounts 221 of FIG. 2. Ten buddy accounts may be associated with six buddies via messaging services "A" and "B", e.g. as specified in buddy accounts 227 of FIG. 2. A buddy may subscribe to messaging services "A" and/or "B" using one or more buddy accounts. For example, buddy "Justin" may subscribe to messaging service "A" with separate buddy accounts "Justin1" and "Justin2". Additionally, buddy "Justin" may subscribe to messaging service "B" with buddy account "Justin3". "Justin1", "Justin2", and "Justin3" can be determined to be the same buddy (other user) from a contact or address book that specifies these three buddy accounts for the same person (the other user). User account "PeterA" may be configured with a buddy list, e.g. as specified in groups 229 of FIG. 2, to include buddy accounts "Justin1", "Justin2", "Ricci1", "Matt1", "Jane1" and "Joe1". Likewise, as illustrated in accounts 303, user account "PeterB" may be configured with a buddy list including buddy accounts "Justin3", "Jeromy1", "Joe2" and "Ricci2".

Groups 305 may include buddy groups "Work", "Home" and "Music", e.g. as specified in Groups 229 of FIG. 2. Each buddy group may include buddy accounts in messaging services "A" and/or "B", such as buddy group "Work" includes buddy accounts "Justin1", "Justin2", "Ricci1" of messaging service "A" and buddy accounts "Justin3" and "Jeromy1" of messaging service "B". A buddy may belong to different buddy groups via combinations of accounts of the same or different services. For example, buddy "Justin" may belong to both buddy group "Work" and "Home" with buddy accounts "Justin1" and "Justin2" respectively in messaging service "A" and buddy account "Justin3" in messaging service "B".

Local presence status 307 may be configured with three different values "Available", "Away" and "Offline", e.g. as specified in presence status configurations 231 of FIG. 2. An account in messaging service "A" may be associated with one of three different service specific presences 309 "Online", "Away" and "Offline". Illustratively, an account in messaging service "B" may be associated with one of three different service specific presences 311 "Available", "Idle" and "Unavailable". In one embodiment, multiple service specific presences from messaging service "A" and/or "B" may be combined into one single local presence status based on rules preconfigured in a messaging client, e.g. in presence status configurations 231 of FIG. 2.

Turning now to FIG. 3B, service specific presences 313, 315 may be associated with buddy accounts 303 of FIG. 3A as published from corresponding messaging services "A" and "B" respectively, e.g. according to buddy accounts 227 of FIG. 2. Each account can be associated with a single presence status from a corresponding messaging service. Accordingly, selective presence statuses 317 may indicate a single buddy having multiple local presence statuses selectively according to different buddy groups. For example, buddy "Justin" may be associated with a local presence status "Available" in buddy group "Work" while associated with another local presence status "Away" in buddy group "Home".

Local presence status "Available" 325 may be based on unifying or combining service specific presences "Online" 319, "Offline" 321 in messaging service "A" and "Unavailable" 323 for messaging service "B" via different accounts "Justin1", "Justin2" and "Justin3" associated with buddy "Justin" in different buddy groups as illustrated in accounts 303 and groups 305 of FIG. 3A. In one embodiment, one or more rules may determine that buddy "Justin" in buddy group "Work" is available for message exchange with a local presence status "Available" if any of associated buddy accounts "Justin1", "Justin2" and "Justin3" in corresponding messaging services indicate such availability. Here, as an example, account "Justin1" is published with presence status "Online" 319 in messaging service "A". As a result, according to exemplary rules for combining presence statuses, buddy "Justin" in buddy group "Work" may be available for message exchange with the local presence status "Available" 325 regardless of which presence statuses are associated with accounts "Justin2" and "Justin3".

In another example, one or more rules may be applied to determine a presence status of buddy "Justin" in buddy group "Home". For example, if each buddy account "Justin2", "Justin3" associated with buddy "Justin" in corresponding messaging services indicates buddy "Justin" has not logged in, the buddy "Justin" may be designated with a local presence status "Offline" 327 in buddy group "Home". Here, as an example, account "Justin2" is published with service specific presence "Offline" 321 in messaging service "A" and account "Justin3" is published with service specific presence "Unavailable" in messaging service "B". As a result, according to exemplary configurations for combining presence statuses, buddy "Justin" in buddy group "Home" may have not logged in for message exchanges with the local presence status "Offline".

Turning now to FIG. 3C, settings 329 may represent selective presence settings for a local user "Peter" against buddies 301 of FIG. 3A in different buddy groups 305 of FIG. 3A based on local presence statues 307 of FIG. 3A. Settings 329 may include selective presence setting 331 to specify a requirement for local user "Peter" to appear "Available" for buddy group "Work". Additionally, settings 329 may include selective presence setting 333 indicating another requirement for local user "Peter" to appear "Available" for buddy group "Joe", which may represent a group of all buddy accounts associated with buddy "Joe" in the messaging services. A user interface may include settings 329 presented for local user "Peter" to configure local presence statues for buddy groups without indicating neither any user account of local user or any buddy account for user "Peter".

Presence status constraints 335 may represent constraints generated based on settings 329, e.g. via presence status resolution module 209 of FIG. 2. In one embodiment, the constraints may be generated separately for each buddy selected at different buddy groups. For example, Justin at Work 337 may correspond to buddy "Justin" selected for buddy group "Work" to generate constraints 341 including Boolean relationships among possible service specific settings for user accounts associated with user "Peter" and buddy accounts associated with buddy "Justin" for user "Peter" to appear available (or ready) for message exchange to buddy "Justin" in buddy group "Work". Constraints 341 may be satisfied if at least one user account of user "Peter" appears available for message exchange with at least one buddy account of buddy "Justin". As such, constraints 341 may represent a service specific setting for user account "PeterA" to appear "Online" for buddy account "Justin1" in messaging service "A", a service specific setting for user account "PeterA" to appear "Online" for buddy account "Justin2" in messaging service "A", or a service specific setting for user account "PeterB" to appear "Available" in messaging service "B".

In another example, Justin at Home 339 may correspond to buddy "Justin" selected from buddy group "Home" to generate constraints 343 for user "Peter" to appear not available for message exchange to buddy "Justin" in buddy group "Home". In one embodiment, user "Peter" may appear not available for message exchange to buddy "Justin" if each user account of user "Peter" appears not available for message exchange to each buddy account of buddy "Justin". As such, constraints 343 may indicate requirements of a service specific setting for user account "PeterA" to appear "Offline" for buddy account "Justin2" in messaging service "A" and a service specific setting for user account "PeterB" to appear "Unavailable" for buddy account "Justin3" in messaging service "B".

Potential constraint conflicts in presence status constraints 335 may be identified and/or resolved, e.g. via presence status resolution module 209 of FIG. 2. In one embodiment, constraints 341 include an optional requirement (e.g. based on Boolean OR relationship) that user account "PeterB" appears "Available" for buddy account "Justin3" in messaging service "B". Constraint 343, however, include an absolute requirement (e.g. based on Boolean AND relationship) that user account "PeterB" appears "Unavailable" for buddy account "Justin3" in messaging service "B". As a result, the optional requirement in constraints 341 for user account "PeterB" may be removed based on constraint resolution.

Notification messages 345 may represent messages identified according to resolved presence status constraints for messaging services "A" and "B", e.g. via presence messaging module 207 of FIG. 2. For example, messages 347 may represent three presence notification messages for message service "A" which supports group presence notification messages, such as message "Online(PeterA, Justin1, Ricci1, Justin2, Joe1)" to set a service specific presence for user account "PeterA" as "Online" for a group of buddy account "Justin1, Ricci1, Justin2, Joe1". Messages 349 may represent four account presence notification messages for message service "B", such as messages "Unavailable(PeterB, Justin3)" and "Unavailable(PeterB, Joe2)" for setting the same service specific presence "Unavailable" for user account "PeterB" with respect to two buddy accounts "Justin3" and "Joe2". Message service "B" may not support group presence notification messages.

Figure 4:
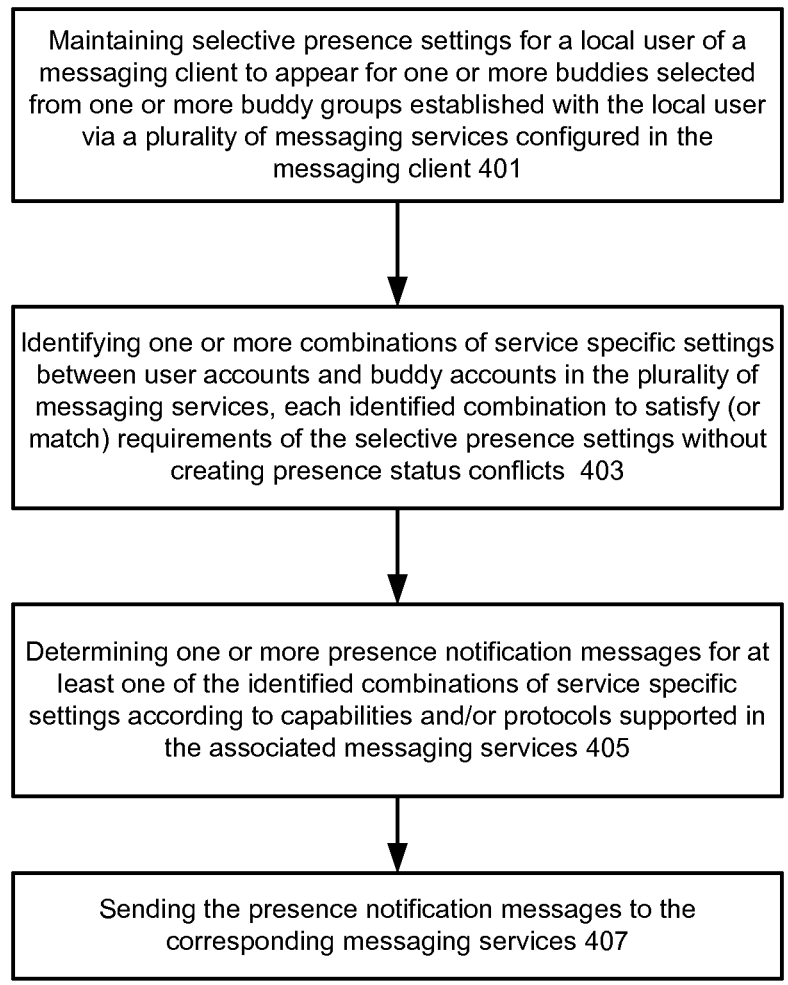
FIG. 4 is a flow diagram illustrating one embodiment of a process to send presence notification messages according to selective presence settings.

FIG. 4 is a flow diagram illustrating one embodiment of a process to send presence notification messages according to selective presence settings. Exemplary process 400 may be performed by a processing logic that may comprise hardware (circuitry, dedicated logic, etc.), software (such as is run on a dedicated machine), or a combination of both. For example, process 400 may be performed by some components of system 200 of FIG. 2. At block 401, the processing logic of process 400 can maintain selective presence settings for a local user of a messaging client to appear for one or more buddies selected from one or more buddy groups established with the local user via multiple messaging services configured in the messaging client. For example, the processing logic of process 400 may receive selective presence settings via GUI presenting representations of buddies, buddy groups and local presence statuses without displaying underlying user accounts, buddy accounts, messaging services and selective presence settings for individual messaging services. Alternatively, the processing logic of process 400 can detect changes in account settings, such as account settings 217 of FIG. 2, including, for example, adding/removing a buddy account, a messaging service, a user account, changes in buddy group specifications etc. Changes in account settings may require synchronizing with existing selective presence settings, such as in presence settings 237 of FIG. 2, via presence notification.

In one embodiment, a buddy may represent, for example, a friend, a family member, a colleague or other social contact of a local user of a messaging client as an entry in an address book or other contact applications running in the messaging client. One or more user accounts may be associated with the local user of the messaging client configured with at least one messaging service. Each user account may subscribe to no more than one messaging service. In some embodiments, the local user may be associated with multiple separate user accounts in one messaging service. Similarly, each buddy may be associated with multiple buddy accounts, each subscribing to no more than one messaging service. A buddy can have more than one buddy accounts in a single messaging service. Typically, an account in a messaging service can be uniquely identified with an identifier. A full representation of an account for a messaging service may include both an account identifier (e.g. "justin1") and a service identifier (e.g. "aim.com"), such as "justin1@aim.com", may uniquely identify the account among multiple messaging services.

At block 403, in one embodiment, the processing logic of process 400 may identify one or more combinations of service specific settings, each combination to satisfy the requirements for maintaining presence status settings without creating presence status conflicts in associated messaging services. A service specific setting may specify a service specific presence for a user account to appear to a buddy account within a messaging service (e.g. including both the user account and the buddy account). Typically, there can be a finite number of possible service specific settings according to account settings in a messaging client, such as account settings 217 of FIG. 2. For example, if there are N user accounts and M buddy accounts associated with the messaging client in one messaging service which provide P separate service specific presences, the total number of possible service specific settings for the local user of the messaging client in the messaging service can be N*M*P.

In one embodiment, the processing logic of process 400 can parse or map selective presence settings, such as in presence settings 237 of FIG. 2 or received from a user interface, into possible service specific settings according to, for example, preconfigured rules, such as in presence status configurations 231 of FIG. 2. Each local presence status may be mapped into one or more service specific presences of different messaging services. Typically, a user account in a messaging service may be allowed to appear with no more than one service specific presence for a buddy account of the same messaging service. Thus, a presence status conflict in a combination of service specific settings may be identified if different service specific presences are specified for the same pair of a user account and a buddy account.

At block 405, the processing logic of process 400 may determine one or more presence notification messages for at least one of identified combinations of service specific settings which satisfy requirements to maintain selected presence settings for the associated messaging services. In one embodiment, each service specific setting for a messaging service may correspond to one presence notification message of the messaging service. The processing logic of process 400 may heuristically or randomly select one of the identified combinations of service specific settings. For example, the processing logic of process 400 can assign a score for each combination for a ranking purpose. As a result, the one combination with the best score (highest or lowest) may be selected. In one embodiment, the processing logic of process 400 may determine a total number of (account or group) presence notification messages required for each combination identified. The processing logic of process 400 can assign a score for a combination of service specific settings as the minimum number of presence notification messages required to notify the corresponding messaging services for the combination of service specific settings. A heuristic based on such a score can reduce data communication for selective presence settings.

At block 407, the processing logic of process 400 may send out presence notification messages to corresponding messaging services with a combination of service specific settings, such as based on presence messaging module 207 of FIG. 2.

In one embodiment, the processing logic of process 400 may combine multiple service specific settings into one single group notification message according to capabilities or protocols provided by a corresponding messaging service. For example, if a messaging service supports a capability or provides a message protocol to specify a service specific presence for a user account to appear to a group of buddy accounts, the processing logic of process 400 may send one group presence notification message setting the service specific presence for a group of buddy accounts instead of multiple account notification messages setting the service specific presence for each buddy account in the group.

Figure 5:
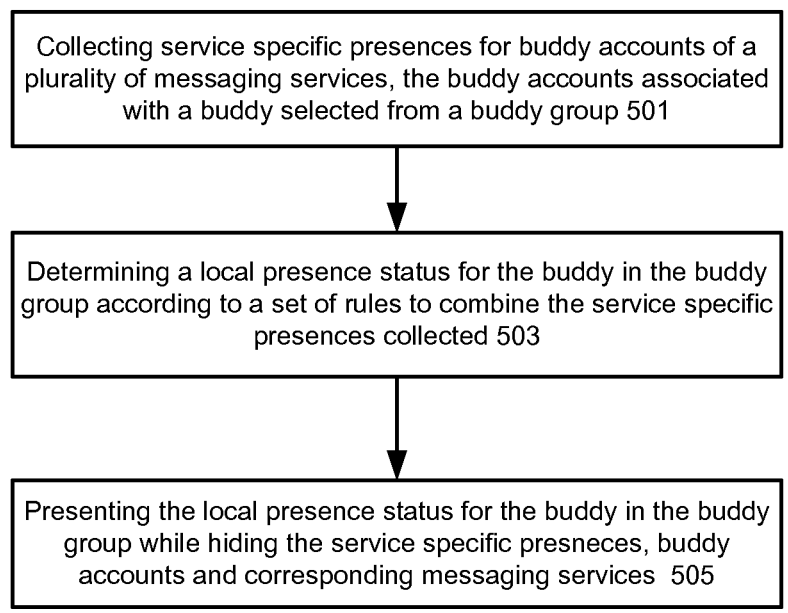
FIG. 5 is a flow diagram illustrating one embodiment of a process to unify presence information from multiple messaging services.

FIG. 5 is a flow diagram illustrating one embodiment of a process to unify presence information from multiple messaging services. Exemplary process 500 may be performed by a processing logic that may comprise hardware (circuitry, dedicated logic, etc.), software (such as is run on a dedicated machine), or a combination of both. For example, process 500 may be performed by some components of system 200 of FIG. 2. At block 501, the processing logic of process 500 may collect service specific presences for one or more buddy accounts in one or more messaging services. These buddy accounts may belong to a buddy selected from a buddy group, such as configured in account settings 217 of FIG. 2. The processing logic of process 500 may initiate collection of the service specific presences responding to a user instruction (e.g. via GUI), notifications from messaging services (e.g. for publication of presence status for buddy accounts), and/or in a periodic manner. User instructions may include changes in configurations for buddy groups and/or buddy accounts, such as in account settings 217 and/or buddies 215.

In one embodiment, at block 503, the processing logic of process 500 can determine a local presence status for a buddy in (or selected from) a buddy group according to a configuration, such as a set of rules in presence status configurations 231 of FIG. 2, to combine collected service specific presences. For example, the local presence status may indicate the buddy in the buddy group is available for message exchange if at least one of the collected service specific presences for a particular buddy account indicates availability for message exchange via the corresponding messaging service. Alternatively, the local presence status may indicate the buddy in the buddy group is not available for message exchange if the collected service specific presences indicate each corresponding buddy account is not available for message exchanges. In one embodiment, a buddy may be associated with separate local presence statuses, e.g. independent with each other, in different buddy groups. Other rules for combining service specific presences into a local presence status in a messaging client may apply. At block 505, the processing logic of process 500 may present the local presence status representing a combination of the collected service specific presences for the buddy in the buddy group without displaying the service specific presences, the buddy accounts and the corresponding messaging services, which might be completely hidden from a user interface display of the messaging client.

Figure 6:
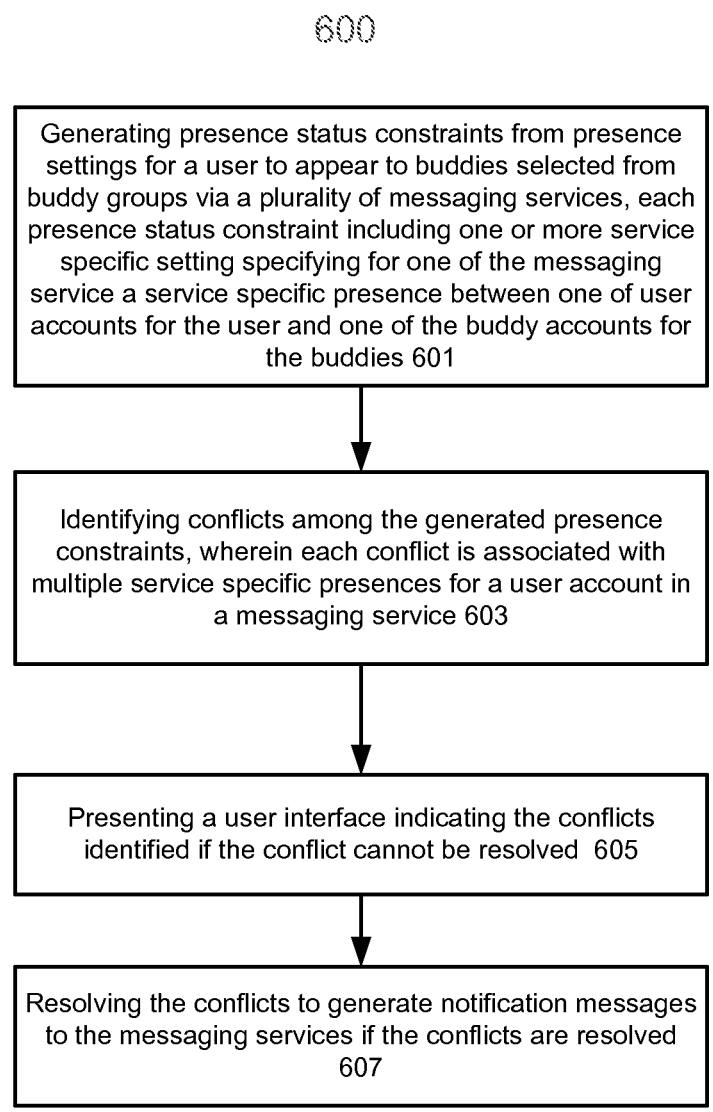
FIG. 6 is a flow diagram illustrating one embodiment of a process to determine presence notification messages for selective presence settings.

FIG. 6 is a flow diagram illustrating one embodiment of a process to determine presence notification messages for selective presence settings. Exemplary process 600 may be performed by a processing logic that may comprise hardware (circuitry, dedicated logic, etc.), software (such as is run on a dedicated machine), or a combination of both. For example, process 600 may be performed by some components of system 200 of FIG. 2. At block 601, the processing logic of process 600 may generate presence status constraints from selective presence settings, such as presence settings 237 of Figure. A presence setting or a selective presence setting may designate a local presence status for a user to appear to buddies selected from buddy groups via multiple messaging services. Each presence status constraint may include one or more service specific settings specifying service specific presences between user accounts for the user and buddy accounts for the buddies via the messaging services. In one embodiment, the processing logic of process 600 may receive an update for selective presence settings via a user interface of a messaging client, such as client 201 of FIG. 2. Alternatively, the processing logic of process 600 may respond to changes in messaging account settings and/or configurations, such as in account settings 217 of FIG. 2 for maintaining existing selective presence settings.

According to one embodiment, at block 603, the processing logic of process 600 may identify conflicts among generated presence status constraints. For example, each presence status constraint may include one or more service specific settings related in Boolean relationships. A presence status constraint may correspond to one selective presence setting to specify one or more combinations of alternative service specific settings among user accounts and buddy account via corresponding messaging services, each combination to support the selective presence setting. Typically, a conflict may occur if multiple service specific settings for one messaging service require a user account to appear in more than one service specific presences for a buddy account. The processing logic of process 603 may perform conflict resolutions, for example, to search for at least one combination of alternative service specific settings to satisfy generated presence status constraints.

At block 605, in one embodiment, if conflicts among generated presence status constraints cannot be resolved, the processing logic of process 600 may present a user interface to notify a local user with a setting conflict, e.g. via user interface module 213 of FIG. 2. The conflicts may not be resolved if no combination of possible service specific settings (based on user accounts, buddy accounts via associated messaging services) can be found (e.g. via a search among combinations of possible service specific settings) to satisfy the generated presence status constraints. The processing logic of process 600 may solicit user inputs to update selective presence settings to resolve the conflicts. In some embodiments, the processing logic of process 600 may provide suggested setting updates to facilitate the local user in conflict resolution. The processing logic of process 600 may repeat conflict resolution operations interactively with the local user via the graphical user interface until conflicts from presence status constraints are resolved.

In one embodiment, at block 607, the processing logic of process 600 may send one or more presence notification messages for service specific settings associated with buddy accounts to corresponding messaging services according to resolved presence status constraints. A presence status constraint may include an existing service specific setting between a user account and a buddy account. An existing service specific setting may have already been notified in the corresponding messaging service. The processing logic of process 600 may select, from resolved presence status constraints, service specific settings which have not yet been notified in associated messaging services. For example, the processing logic of process 600 may determine whether a service specific setting is currently enforced via user account settings, such as stored in user accounts 221 of FIG. 2. Alternatively, the processing logic of process 600 may send service specific messages to inquire about current service specific presences or settings for a user account, e.g. with respect to a buddy account and/or a group of buddy accounts within a corresponding messaging service.

Figure 7:
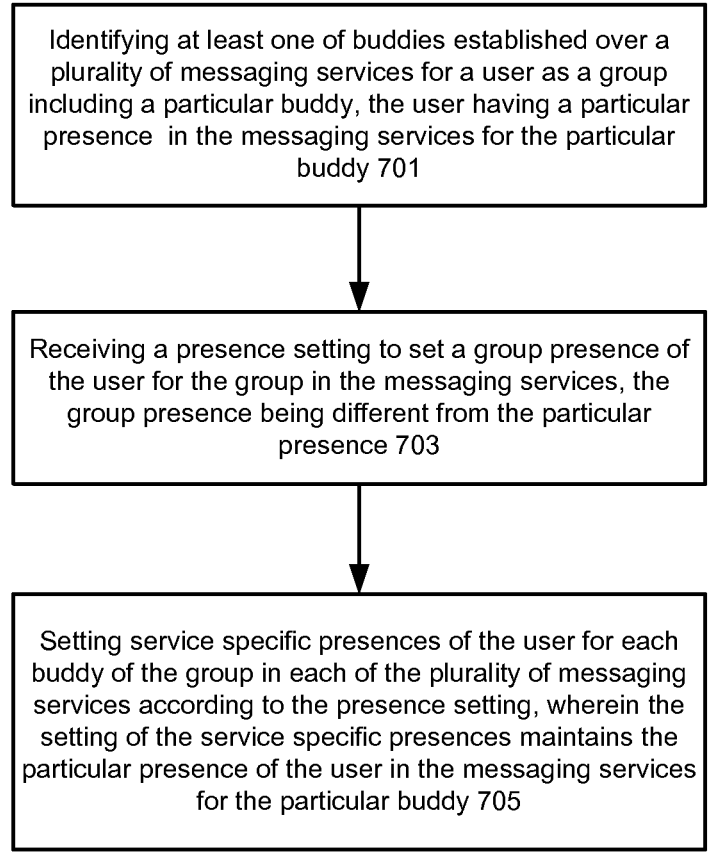
FIG. 7 is a flow diagram illustrating one embodiment of a process to set a presence of a user for a group of buddies in multiple messaging services.

FIG. 7 is a flow diagram illustrating one embodiment of a process to set a presence of a user for a group of buddies in multiple messaging services. Exemplary process 700 may be performed by a processing logic that may comprise hardware (circuitry, dedicated logic, etc.), software (such as is run on a dedicated machine), or a combination of both. For example, process 700 may be performed by some components of system 200 of FIG. 2. At block 701, the processing logic of process 700 may identify a group of buddies for a user. For example, the group may be selected from buddies of the user of a messaging client participating in multiple messaging services. The user may have an existing local presence status in the messaging client for a particular buddy included in the group.

At block 703, in one embodiment, the processing logic of process 700 may receive a presence setting to set a group presence of the user for the group of buddies in the messaging client, such as via a user interface of the messaging client. The group presence may be one of local presence statuses configured in the messaging client. In one embodiment, the presence setting received for the group presence may be independent of (e.g. different, similar or the same with) an existing local presence status for the particular buddy included in the group.

In response, at block 705, the processing logic of process 700 may set service specific presences of the user for each of the group of buddies in each of multiple messaging services associated with the messaging client without affecting the existing local presence status for the particular buddy included in the group. The processing logic of process 700 can maintain the existing local presence status of the user for the particular buddy while setting service specific presence statuses in the multiple messaging services for setting a group presence of the user for the group according to a received presence setting.

For example, the processing logic of process 700 may designate a group presence of the user for the group by setting the service specific presences. Additionally, the particular buddy may belong to both the group (e.g. first group) and a separate group (e.g. second group) of buddies of the user associated with the existing local presence status of the user. The processing logic of process 700 can use a configuration mapping between possible service specific presences in the messaging services and possible local presences including the group presence in the messaging client for setting the service specific presences for the group. In some embodiments, the processing logic of process 700 may set service specific presences of the user for each buddy of the group of buddies for each of the multiple messaging services in the messaging client according to the received presence setting without altering a local presence setting of any buddy of the user not in the group for any messaging service.

Figure 8:
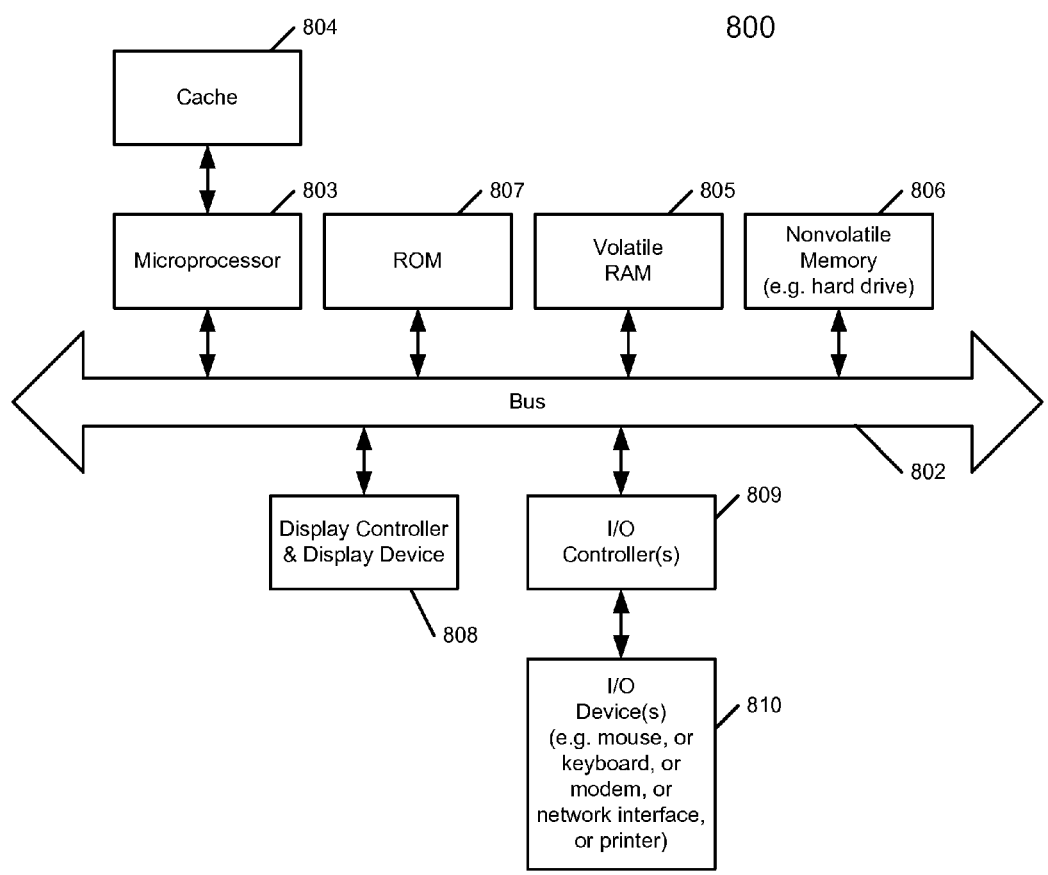
FIG. 8 is a block diagram of a data processing system, which may be used with one embodiment of the invention.

FIG. 8 is a block diagram of a data processing system, which may be used with one embodiment of the invention. For example, the system 800 may be used as a client or server system such as client systems 107, 109 and/or chat servers 101, 103 of FIG. 1. Note that while FIG. 8 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 8 may, for example, be an Apple Macintosh computer or MacBook, or an IBM compatible PC.

As shown in FIG. 8, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Method and apparatus for initiating and managing chat sessions have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring", "selecting", "initiating", "displaying", "determining", "sending", "allowing", "transitioning", "enabling", "merging", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method for a plurality of messaging services, the method comprising:
   maintaining a configuration for one or more local presence statuses of one or more buddy groups of a user using the messaging services, each buddy group including one or more buddy accounts established via the messaging services with the user, at least one of the buddy groups including buddy accounts established via more than two of the messaging services, the user having one or more user accounts subscribing to the messaging services, the user having one or more buddies established via the messaging services, each buddy account belonging to one of the buddies, each local presence status to represent a state of message exchanges between the user and a buddy group according to the configuration without revealing the user accounts and the buddy accounts;
   identifying one or more service specific settings matching presence settings via the configuration, each presence setting associated with one of the local presence statuses and one of the buddy groups, each service specific setting specifying a service specific presence of one of the messaging services for one of the user accounts and one of the buddy accounts, the local presence statuses being separate from service specific presences of the messaging services;
   determining a presence notification message for the service specific setting in the one of the messaging services; and
   sending the presence notification message to notify the one of the messaging services for the presence settings.

2. The method of claim 1,
   wherein each local presence status corresponds to zero or more service specific presences of each messaging service, wherein the presence setting specifies one of the local presence statuses for the user with respect to the buddy group.

3. The method of claim 2, further comprising:
   detecting a change for at least one buddy group associated with one of the presence settings.

4. The method of claim 3, wherein the change indicates a new buddy account has been added to the at least one buddy group.

5. The method of claim 3, wherein the change indicates an existing user account has been removed from the user accounts.

6. The method of claim 2, further comprising:
   receiving a user instruction via a user interface, the user instruction including the presence settings.

7. The method of claim 6, wherein the user interface presents the presence settings via a display screen of a client messaging device and wherein the display screen displays the user interface without indicating the user accounts.

8. The method of claim 1, wherein the identification comprises:
   determining one or more of the user accounts for the buddy group associated with the presence setting; and
   generating one or more possible service specific settings for the presence setting, each possible service specific setting associated with one of the messaging services, the possible service specific setting specifying one of the determined user accounts and one of the at least one buddy account of the buddies in the messaging service.

9. The method of claim 8, wherein each determined user account and at least one buddy account of the buddy group subscribe to a common messaging service.

10. The method of claim 8, wherein the one or more possible service specific settings are related in Boolean relationships for the presence setting.

11. The method of claim 10, wherein the presence status indicates the user is available for message exchange with the buddy group and wherein the Boolean relationships include an OR relationship.

12. The method of claim 10, wherein the presence status indicates the user is not available for message exchange with the buddy group and wherein the Boolean relationships include an AND relationship.

13. The method of claim 9, further comprising:
   identifying a conflict between one of the possible service specific settings and a separate possible service specific setting generated for a separate one of the presence settings, wherein the conflict indicates a user account to appear in multiple service specific presences for a buddy account in the common messaging service; and
   resolving the conflict if identified, wherein the resolution to select one of the multiple service specific presence.

14. The method of claim 9, further comprising:
   determining if one of the possible service specific settings is current in an associated messaging service, wherein the presence status is matched if the one of the possible service specific settings is current.

15. The method of claim 14, wherein the determination is based on a comparison of the possible service specific settings and a record of service specific settings previously stored.

16. The method of claim 1, wherein the presence notification message specifies the service specific presence for the one of the user accounts with respect to a plurality of buddy accounts in the one of the messaging services, each of the plurality of buddy accounts associated with one of the service specific settings matching the presence settings.

17. A machine implemented method for a plurality of messaging services, the method comprising:
  maintaining a configuration specifying one or more local presence statuses of one or more buddy groups of a user using the messaging services, each buddy group including one or more buddy accounts established via the message services with the user, at least one of the buddy groups including buddy accounts established via more than two of the messaging services, the user having one or more user accounts subscribing to the messaging services, the user having one or more buddies established via the messaging services, each buddy account belonging to one of the buddies, each local presence status to represent a state of message exchanges between the user and a buddy group according to the configuration without revealing the user accounts and the buddy accounts;
  collecting service specific presences for buddy accounts of one of the buddies in one of the buddy groups, each service specific presence published for one of the buddy accounts of the one buddy in one of the messaging services, the local presence statuses being separate from the service specific presences of the messaging services;
  determining one of the local presence statuses for the one buddy in the one buddy group according to the configuration for the service specific presences collected; and
  presenting the one local presence status for the one buddy in the one buddy group for the messaging services.

18. The method of claim 17, further comprising:
  configuring the local presence statuses in the configuration independent of the messaging services; and
  configuring a set of rules to combine one or more service specific presences of the messaging services into the one local presence status, wherein the determination is based on the set of rules.

19. The method of claim 17, wherein the one local presence status indicates the one buddy group is available for message exchange with the user and wherein at least one of the service specific presences indicates the one buddy account is available for message exchanges.

20. A machine implemented method for a plurality of messaging services, the method comprising:
  maintaining a configuration specifying one or more local presence statuses of one or more buddy groups of a user using the messaging services, each buddy group including one or more buddy accounts established via the message services with the user, at least one of the buddy groups including buddy accounts established via more than two of the messaging services the user having one or more user accounts subscribing to the messaging services, the user having one or more buddies established via the messaging services, each buddy account belonging to one of the buddies, each local presence status to represent a state of message exchanges between the user and a buddy group according to the configuration without revealing the user accounts and the buddy accounts;
  generating presence status constraints from presence settings for the user to appear to the buddies via the messaging services according to the configuration, each presence status constraint including one or more service specific settings, each service specific setting specifying for one of the messaging service a service specific presence between one of user accounts for the user and one of the buddy accounts for the buddies, the local presence statuses being separate from service specific presences of the message services;
  identifying conflicts among the generated presence constraints, wherein each conflict is associated with multiple service specific presences for a user account in a messaging service;
  presenting a user interface indicating the conflicts identified if the conflict cannot be resolved; and
  repeating the generation, identification and the presentation until the conflicts are resolved.

21. The method of claim 20, wherein each present setting specifies one of the local presence statuses for one of the buddy groups, the one local presence status being configured independent of the messaging service, and the one buddy group including at least one of the buddy accounts.

22. The method of claim 21, wherein the conflict is associated with a first presence status constraint generated from a first presence setting, a second presence status constraint generated from a second presence setting, the first presence setting specifying a first buddy group, the second presence setting specifying a second buddy group, the first and second buddy groups including a common buddy account, wherein the conflict is resolved with a change of the first buddy group without changing the first and second presence settings, and wherein the change includes removal of the common buddy account from the first buddy group.

23. The method of claim 20, wherein the presence settings are received from the user interface and wherein the user interface indicates the messaging service associated with the conflict identified.

24. The method of claim 20, further comprising:
  updating the presence status constraints to resolve the conflicts; and
  generating one or more notification messages to the messaging services according to the updated presence status constraints.

25. A machine-readable non-transitory storage medium having instructions, when executed by a machine, cause the machine to perform a method for a plurality of messaging services, the method comprising:
  maintaining a configuration for one or more local presence statuses of one or more buddy groups of a user using the messaging services, each buddy group including one or more buddy accounts established via the messaging services with the user, at least one of the buddy groups including buddy accounts established via more than two of the messaging services, the user having one or more user accounts subscribing the messaging services, the user having one or more buddies established via the messaging services, each buddy account belong to one of the buddies, each local presence status to represent a state of message exchanges between the user and a buddy group according to the configuration without revealing the user accounts and the buddy accounts;
  identifying one or more service specific settings matching presence settings via the configuration, each presence setting associated with one of the local presence statuses and one of the buddy groups, each service specific setting specifying a service specific presence of one of the messaging services for one of the user accounts and one of the buddy accounts, the local presence statuses being separate from the service specific presences of the messaging services;

determining a presence notification message for the service specific setting in the one of the messaging services; and sending the presence notification message to notify the one of the messaging services for the presence settings.

26. An apparatus, comprising:

a memory storing executable instructions;

a network interface coupled to a plurality of messaging services;

a processor coupled to the network interface and the memory to execute the executable instructions from the memory for the messaging services, the processor being configured to:

maintain a configuration specifying one or more local presence statuses of one or more buddy groups of a user using the messaging services, each buddy group including one or more buddy accounts established via the message services with the user, at least one of the buddy groups including buddy accounts established via more than two of the messaging services the user having one or more user accounts subscribing to the messaging services, the user having one or more buddies established via the messaging services, each buddy account belonging to one of the buddies, each local presence status to represent a state of message exchanges between the user and a buddy group according to the configuration without revealing the user accounts and the buddy accounts;

generate presence status constraints from presence settings for the user to appear to the buddies via the messaging services according to the configuration, each presence status constraint including one or more service specific settings, each service specific setting specifying for one of the messaging service a service specific presence between one of user accounts for the user and one of the buddy accounts for the buddies, the local presence statuses being separate from service specific presences of the messaging services;

resolve conflicts among the generated presence constraints, wherein each conflict is associated with multiple service specific presences for a user account in a messaging service; and generate one or more notification messages for the presence settings to the messaging services via the network interface according to the resolved conflicts of the generated presence constraints.

27. A machine implemented method for a plurality of messaging services, the method comprising:

maintaining a configuration specifying one or more local presence statuses with one or more buddy groups of a user using the messaging services, each buddy group including one or more buddy accounts established via the message services with the user, the user having one or more user accounts subscribing to the messaging services, the user having one or more buddies established via the messaging services, each buddy account belonging to one of the buddies, at least one of the buddy groups including buddy accounts established via more than two of the messaging services, each local presence status to represent a state of message exchanges between the user and a buddy group according to the configuration without revealing the user accounts and the buddy accounts, wherein the buddy groups include a first group having one or more buddy accounts of a particular one of the buddies, receiving a presence setting to set a group presence of the user for the first group via one of the local presence statuses; and setting service specific presences of the user for each buddy of the first group in each of the messaging services according to the presence setting, wherein the setting of the service specific presences maintains the particular presence for the particular buddy, the local presence statuses being separate from the service specific presences of the messaging services.

28. The method of claim 27, wherein the buddy groups include a second group, wherein the user has a particular presence for a second group of the buddies via a separate one of the local presence statuses, the second group being separate from the first group, and the second group having at least one buddy account of the particular buddy.

29. The method of claim 27, further comprising:

configuring a mapping between possible service specific presences in the plurality of messaging services and the local presence statuses in the messaging client.

* * * * *